United States Patent
Yanase

(10) Patent No.: US 8,589,204 B2
(45) Date of Patent: Nov. 19, 2013

(54) BUSINESS PROCESS ESTIMATING PROGRAM, BUSINESS PROCESS ESTIMATING METHOD, AND BUSINESS PROCESS ESTIMATING APPARATUS

(75) Inventor: Takashi Yanase, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1272 days.

(21) Appl. No.: 12/040,017

(22) Filed: Feb. 29, 2008

(65) Prior Publication Data

US 2008/0228546 A1    Sep. 18, 2008

(30) Foreign Application Priority Data

Mar. 15, 2007    (JP) .................................. 2007-067438

(51) Int. Cl.
    *G06Q 10/00*    (2012.01)
(52) U.S. Cl.
    USPC ..................... 705/7.21; 705/7.11; 705/7.27
(58) Field of Classification Search
    USPC .......................................... 705/7.11, 7.21, 7.27
    See application file for complete search history.

(56) References Cited

U.S. PATENT DOCUMENTS

| | | | |
|---|---|---|---|
| 6,278,977 B1 * | 8/2001 | Agrawal et al. ..................... 705/7 |
| 6,700,971 B1 * | 3/2004 | Cohen et al. ............. 379/265.06 |
| 6,938,240 B2 * | 8/2005 | Charisius et al. ............. 717/104 |
| 7,357,298 B2 * | 4/2008 | Pokorny et al. ............... 235/375 |
| 2003/0046142 A1 * | 3/2003 | Eitel et al. ....................... 705/11 |
| 2004/0052413 A1 * | 3/2004 | Kunii et al. .................... 382/159 |
| 2005/0201546 A1 * | 9/2005 | Yanase et al. ............ 379/265.12 |

FOREIGN PATENT DOCUMENTS

JP    2006-228019    8/2006

OTHER PUBLICATIONS

Scacchi, W., & Noll, J.. (1997). Process-Driven Intranets: Life-Cycle Support for Process Reengineering. IEEE Internet Computing, 1(5), 42-49. Retrieved Feb. 28, 2011, from ProQuest Computing. (Document ID: 1423975141).*

* cited by examiner

*Primary Examiner* — Jonathan G Sterrett
*Assistant Examiner* — Folashade Anderson
(74) *Attorney, Agent, or Firm* — Staas & Halsey LLP

(57) ABSTRACT

A business process estimating method, apparatus, and program for estimating a process of a business transaction utilizing an information system. The business process estimating method includes specifying a non-operation interval for extracting an information system non-operation interval in accordance with an access log of access to the information system, thereby to specify a business process corresponding to the extracted information system non-operation interval and to specify the information system non-operation interval. The method also includes distributing a non-operation interval time period for distributing a time period of the information system non-operation interval, which has been specified in the specifying the non-operation interval as process time periods of previous and subsequent business processes respectively correlated with previous and subsequent information system non-operation intervals with respect to the information system non-operation interval.

8 Claims, 16 Drawing Sheets

FIG. 3

| TRANSACTION ID | RECEPTIONIST ID | RECEPTION INITIATION DATE AND TIME | RECEPTION COMPLETION DATE AND TIME |
|---|---|---|---|
| 200612180001 | OP001 | 2006/12/18 09:01:00 | 2006/12/18 09:15:30 |
| 200612180002 | OP002 | 2006/12/18 09:03:20 | 2006/12/18 09:20:35 |
| 200612180003 | OP003 | 2006/12/18 09:04:30 | 2006/12/18 09:18:00 |
| 200612180004 | OP004 | 2006/12/18 09:07:45 | 2006/12/18 09:32:40 |
| 200612180005 | OP005 | 2006/12/18 09:10:10 | 2006/12/18 09:26:10 |

FIG. 4

| DATE | TIME | RECEPTIONIST ID | ACCESS ADDRESS |
|---|---|---|---|
| 2006/12/18 | 09:04:00 | OP001 | /kokyaku_kensaku/12345/ |
| 2006/12/18 | 09:04:02 | OP003 | /kiki_kensaku/11111/ |
| 2006/12/18 | 09:04:03 | OP001 | /kokyaku_kensaku/54321/ |
| 2006/12/18 | 09:04:05 | OP002 | /QA_kensaku/22222/ |
| 2006/12/18 | 09:04:07 | OP004 | /buhin_tehai/abcde/ |

FIG. 5

| ADDRESS PATTERN | OPERATION SYSTEM NAME | PROCESS NAME |
|---|---|---|
| /kokyaku_kensaku/ | CUSTOMER RETRIEVAL SYSTEM | CUSTOMER SPECIFICATION |
| /kiki_kensaku/ | DEVICE RETRIEVAL SYSTEM | DEVICE SPECIFICATION |
| /QA_kensaku/ | QA RETRIEVAL SYSTEM | CLASSIFICATION |
| /meintenance_manual/ | MAINTENANCE MANUAL PRESENTATION SYSTEM | CLASSIFICATION |
| /buhin_tehai/ | PARTS ARRANGEMENT SYSTEM | PARTS ARRANGEMENT |

FIG. 6

| PROCESS NAME | STANDARD PROCESS TIME PERIOD |
|---|---|
| CUSTOMER SPECIFICATION | 250 SEC. |
| DEVICE SPECIFICATION | 200 SEC. |
| CLASSIFICATION | 500 SEC. |
| PARTS ARRANGEMENT | 300 SEC. |

FIG. 7

| RECEPTIONIST ID | DATE | INITIATION TIME | COMPLETION TIME | TRANSACTION ID | OPERATION SYSTEM | PROCESS |
|---|---|---|---|---|---|---|
| OP001 | 2006/12/18 | 09:04:00 | 09:06:30 | 20061218001 | CUSTOMER RETRIEVAL | CUSTOMER SPECIFICATION |
| OP001 | 2006/12/18 | 09:06:30 | 09:08:00 | 20061218001 | NON-OPERATION | — |
| OP001 | 2006/12/18 | 09:08:00 | 09:10:20 | 20061218001 | DEVICE RETRIEVAL | DEVICE SPECIFICATION |
| OP001 | 2006/12/18 | 09:10:20 | 09:11:30 | 20061218001 | QA RETRIEVAL | CLASSIFICATION |
| OP001 | 2006/12/18 | 09:11:30 | 09:12:10 | 20061218001 | NON-OPERATION | — |
| OP001 | 2006/12/18 | 09:12:10 | 09:15:30 | 20061218001 | MAINTENANCE MANUAL PRESENTATION | CLASSIFICATION |

FIG. 8

| RECEPTIONIST ID | DATE | INITIATION TIME | COMPLETION TIME | TRANSACTION ID | PROCESS |
|---|---|---|---|---|---|
| OP001 | 2006/12/18 | 09:04:00 | 09:07:20 | 20061218001 | CUSTOMER SPECIFICATION |
| OP001 | 2006/12/18 | 09:07:20 | 09:10:20 | 20061218001 | DEVICE SPECIFICATION |
| OP001 | 2006/12/18 | 09:10:20 | 09:15:30 | 20061218001 | CLASSIFICATION |

FIG. 11A

SYSTEM OPERATION INTERVAL DB

| RECEPTIONIST ID | DATE | INITIATION TIME | COMPLETION TIME | TRANSACTION ID | OPERATION SYSTEM | PROCESS |
|---|---|---|---|---|---|---|
| OP001 | 2006/12/18 | 09:04:00 | 09:06:30 | 20061218001 | CUSTOMER RETRIEVAL | CUSTOMER SPECIFICATION |
| OP001 | 2006/12/18 | 09:06:30 | 09:08:00 | 20061218001 | NON-OPERATION | — |
| OP001 | 2006/12/18 | 09:08:00 | 09:10:20 | 20061218001 | DEVICE RETRIEVAL | DEVICE SPECIFICATION |

FIG. 11B

PROCESS INITIAL ESTIMATION DB

| RECEPTIONIST ID | DATE | INITIATION TIME | COMPLETION TIME | TRANSACTION ID | PROCESS |
|---|---|---|---|---|---|
| OP001 | 2006/12/18 | 09:04:00 | 09:07:20 | 20061218001 | CUSTOMER SPECIFICATION |
| OP001 | 2006/12/18 | 09:07:20 | 09:10:20 | 20061218001 | DEVICE SPECIFICATION |

FIG. 13

| RECEPTIONIST ID | PROCESS | AVERAGE PROCESS TIME PERIOD | SKILL LEVEL |
|---|---|---|---|
| OP001 | CUSTOMER SPECIFICATION | 215 SEC. | HIGH |
| OP001 | DEVICE SPECIFICATION | 350 SEC. | LOW |
| OP001 | CLASSIFICATION | 605 SEC. | LOW |
| OP001 | PARTS ARRANGEMENT | 120 SEC. | HIGH |
| OP002 | CUSTOMER SPECIFICATION | 200 SEC. | HIGH |
| OP002 | DEVICE SPECIFICATION | 225 SEC. | HIGH |
| OP002 | CLASSIFICATION | 430 SEC. | HIGH |
| OP002 | COMPONENT PROCUREMENT | 185 SEC. | LOW |

FIG. 14

| PROCESS NAME | STANDARD PROCESS TIME PERIOD | HIGH-LEVEL SKILLED RECEPTIONIST AVERAGE PROCESS TIME PERIOD | LOW-LEVEL SKILLED RECEPTIONIST AVERAGE PROCESS TIME PERIOD |
|---|---|---|---|
| CUSTOMER SPECIFICATION | 250 SEC. | 205 SEC. | 265 SEC. |
| DEVICE SPECIFICATION | 200 SEC. | 175 SEC. | 220 SEC. |
| CLASSIFICATION | 500 SEC. | 410 SEC. | 620 SEC. |
| COMPONENT PROCUREMENT | 300 SEC. | 230 SEC. | 340 SEC. |

FIG. 15

| RECEPTIONIST ID | DATE | INITIATION TIME | COMPLETION TIME | TRANSACTION ID | PROCESS |
|---|---|---|---|---|---|
| OP001 | 2006/12/18 | 09:04:00 | 09:07:13 | 20061218001 | CUSTOMER SPECIFICATION |
| OP001 | 2006/12/18 | 09:07:13 | 09:10:20 | 20061218001 | DEVICE SPECIFICATION |
| OP001 | 2006/12/18 | 09:10:20 | 09:15:30 | 20061218001 | CLASSIFICATION |

FIG. 16

AVERAGE PROCESS TIME PERIOD DISTRIBUTION MODEL
(SUPERPOSITION OF LOG-NORMAL DISTRIBUTIONS)

$$f(x) = f_H(x) + f_L(x)$$

$$f_H(x) = \frac{1}{\sqrt{2\pi}\sigma_H x} \exp\left(\frac{-(\log x - \mu_H)^2}{2\sigma_H^2}\right) \quad \text{HIGH SKILL LEVEL RECEPTIONIST DISTRIBUTION MODEL}$$

$$f_L(x) = \frac{1}{\sqrt{2\pi}\sigma_L x} \exp\left(\frac{-(\log x - \mu_L)^2}{2\sigma_L^2}\right) \quad \text{LOW SKILL LEVEL RECEPTIONIST DISTRIBUTION MODEL}$$

x: AVERAGE PROCESS TIME PERIOD OF CERTAIN PROCESS BY CERTAIN RECEPTIONIST
F(x): PROBABILITY DENSITY OF x

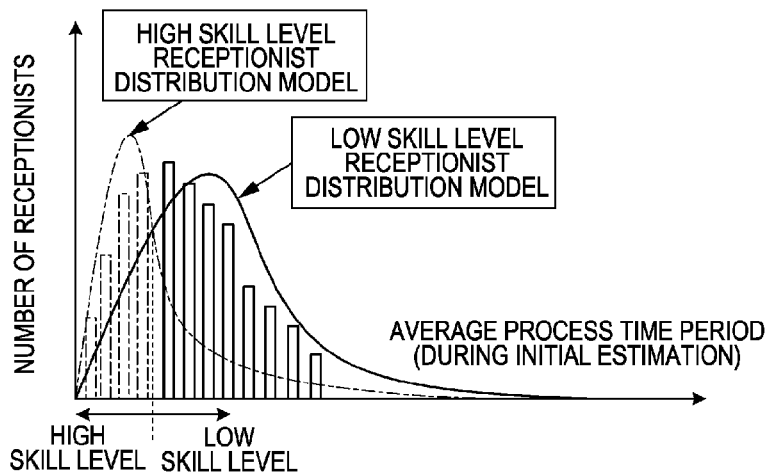

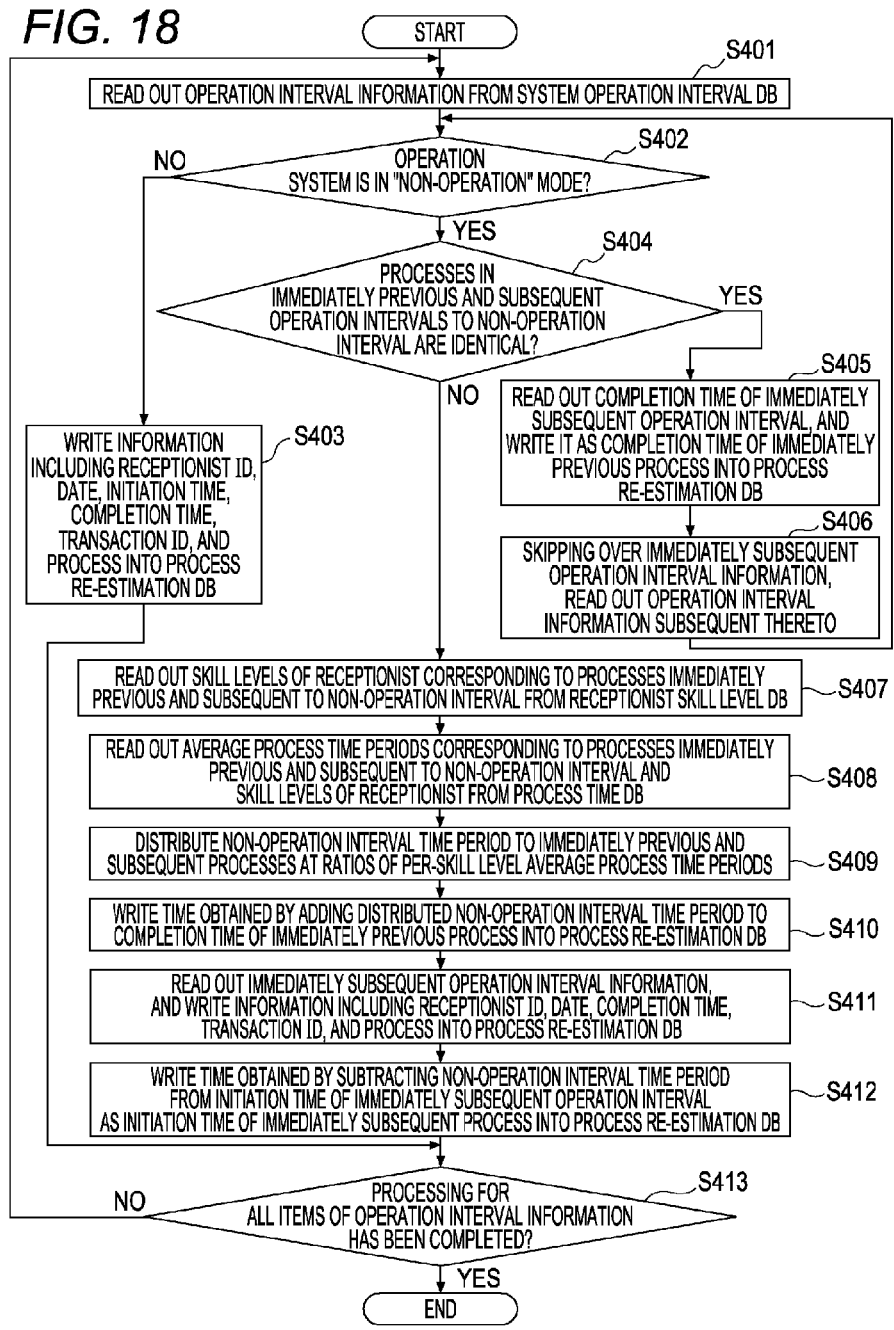

FIG. 19A

SYSTEM OPERATION INTERVAL DB

| RECEPTIONIST ID | DATE | INITIATION TIME | COMPLETION TIME | TRANSACTION ID | OPERATION SYSTEM | PROCESS |
|---|---|---|---|---|---|---|
| OP001 | 2006/12/18 | 09:04:00 | 09:06:30 | 20061218001 | CUSTOMER RETRIEVAL | CUSTOMER SPECIFICATION |
| OP001 | 2006/12/18 | 09:06:30 | 09:08:00 | 20061218001 | NON-OPERATION | — |
| OP001 | 2006/12/18 | 09:08:00 | 09:10:20 | 20061218001 | DEVICE RETRIEVAL | DEVICE SPECIFICATION |

FIG. 19B

PROCESS RE-ESTIMATION DB

| RECEPTIONIST ID | DATE | INITIATION TIME | COMPLETION TIME | TRANSACTION ID | PROCESS |
|---|---|---|---|---|---|
| OP001 | 2006/12/18 | 09:04:00 | 09:07:13 | 20061218001 | CUSTOMER SPECIFICATION |
| OP001 | 2006/12/18 | 09:07:13 | 09:10:20 | 20061218001 | DEVICE SPECIFICATION |

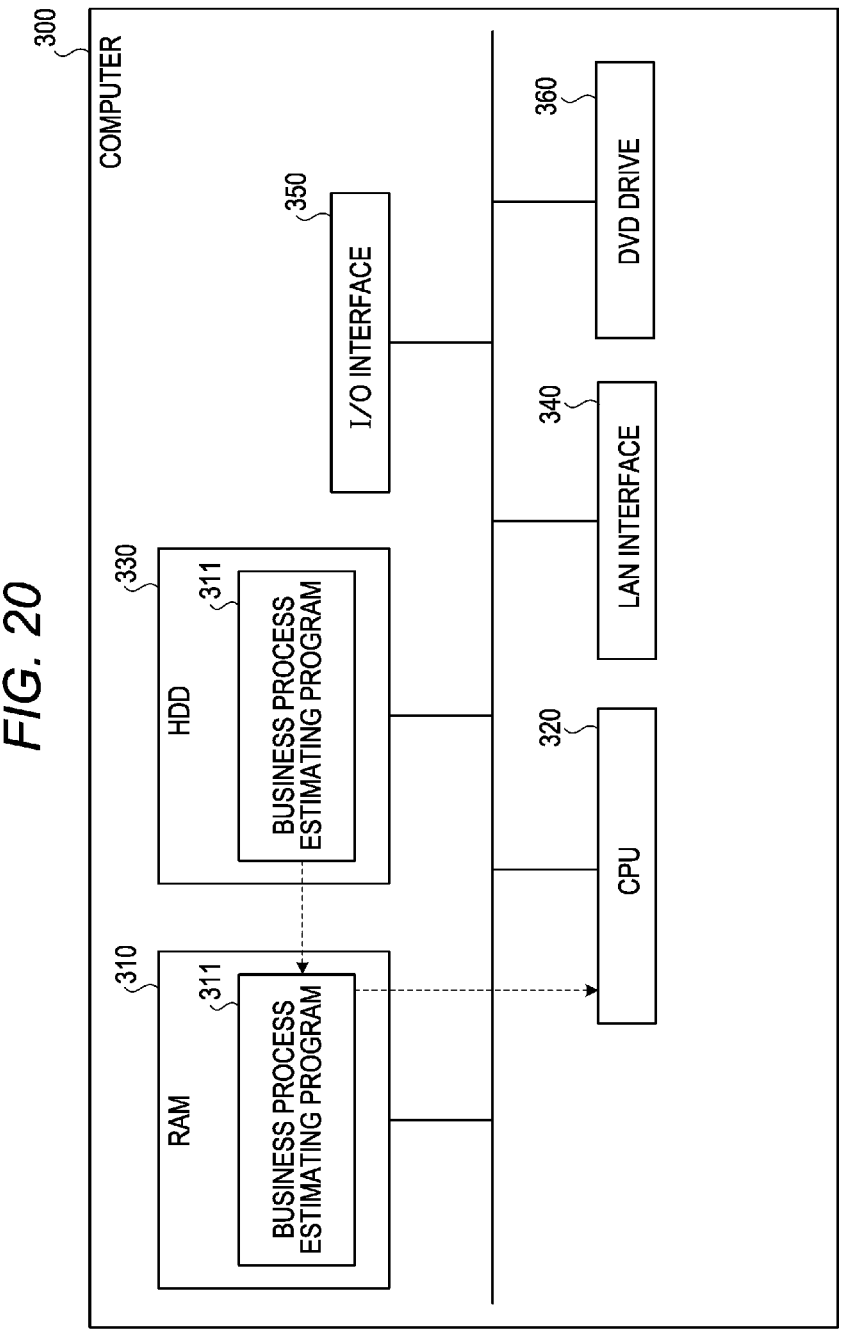

BUSINESS PROCESS ESTIMATING PROGRAM, BUSINESS PROCESS ESTIMATING METHOD, AND BUSINESS PROCESS ESTIMATING APPARATUS

CROSS-REFERENCE TO RELATED APPLICATIONS

This application is related to and claims the benefit of priority from Japanese Patent Application No. 2007-67438, filed on Mar. 15, 2007, the entire contents of which are incorporated herein by reference.

BACKGROUND

1. Field of the Invention

The present invention relates to a business process estimating program, a business process estimating method, and a business process estimating apparatus for estimating a process of a business application (or, "business process", hereinbelow) using an information system.

2. Description of the Related Art

In order to develop an effective reengineering measure in business process reengineering (BPR), it is important to have an adequate knowledge of factors such as an execution sequence of business processes in actual businesses and a time period required by each of such business processes. Conventionally, there have been performed operations, such as direct observation of an actual business and analysis of an image taken of the state of the business to thereby perform direct measurement of each business process time period. However, according to this method, since the business process time period has to be measured using the actual time period, significant costs and time are required for the measurement.

As such, a technique has been developed that performs an estimation in such a manner that, in a business such as business at a call center using an information system, an operation history is extracted by analyzing a message generated by the information system operated during the business, and the extracted operation history is used to perform the estimation (see Japanese Patent Application Laid-Open (JP-A) No. 2006-228019).

However, when an attempt is made to designate a business process from the operation history of the information system, the business process for a time period of non-operation of the information system during telephone communication, memo writing, or the like cannot be specified. Consequently, this makes it difficult to perform operations, such as comprehensive estimation of business processes and accurate estimation of the time period required by each business process.

SUMMARY

According to an embodiment of the present invention, a business process estimating method is used by a business process estimating apparatus for estimating a process of a business transaction utilizing an information system. The business process estimating method includes a non-operation interval specifying operation, e.g., for extracting an information system non-operation interval in accordance with an access log of access to the information system, thereby to specify a business process corresponding to the extracted information system non-operation interval and to specify the information system non-operation interval. The example method also includes a non-operation interval time period distributing operation, e.g., for distributing a time period of the information system non-operation interval, which has been specified in the non-operation interval specifying operation, as process time periods of previous and subsequent business processes respectively correlated with previous and subsequent information system non-operation intervals with respect to the information system non-operation interval.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 3 is a table showing an example of a transaction information DB;

FIG. 4 is a table showing an example of an access log DB;

FIG. 5 is a table showing an example of a system log pattern DB;

FIG. 6 is a table showing an example of a process time DB;

FIG. 7 is a table showing an example of a system operation interval DB;

FIG. 8 is a table showing an example of a process initial estimation DB;

FIGS. 11A and 11B are tables showing example distributions of a non-operation interval, which distributions are provided by the process initial estimating portion;

FIG. 13 is a table showing one example of a receptionist skill level DB;

FIG. 14 is a table showing one example of a process time DB;

FIG. 15 is a table showing one example of a process re-estimation DB;

FIG. 16 illustrates examples of per-receptionist average process time distribution models;

FIG. 18 is a flow chart illustrating a processing procedure of a process re-estimation process in a process re-estimating portion;

FIGS. 19A and 19B are tables showing example distributions of a non-operation interval, which distributions are provided by the process re-estimating portion; and FIG. 20 is a functional block diagram showing an example configuration of a computer for executing a business process estimating program for example embodiments.

DETAILED DESCRIPTION OF THE PREFERRED EMBODIMENTS

Figure 1:
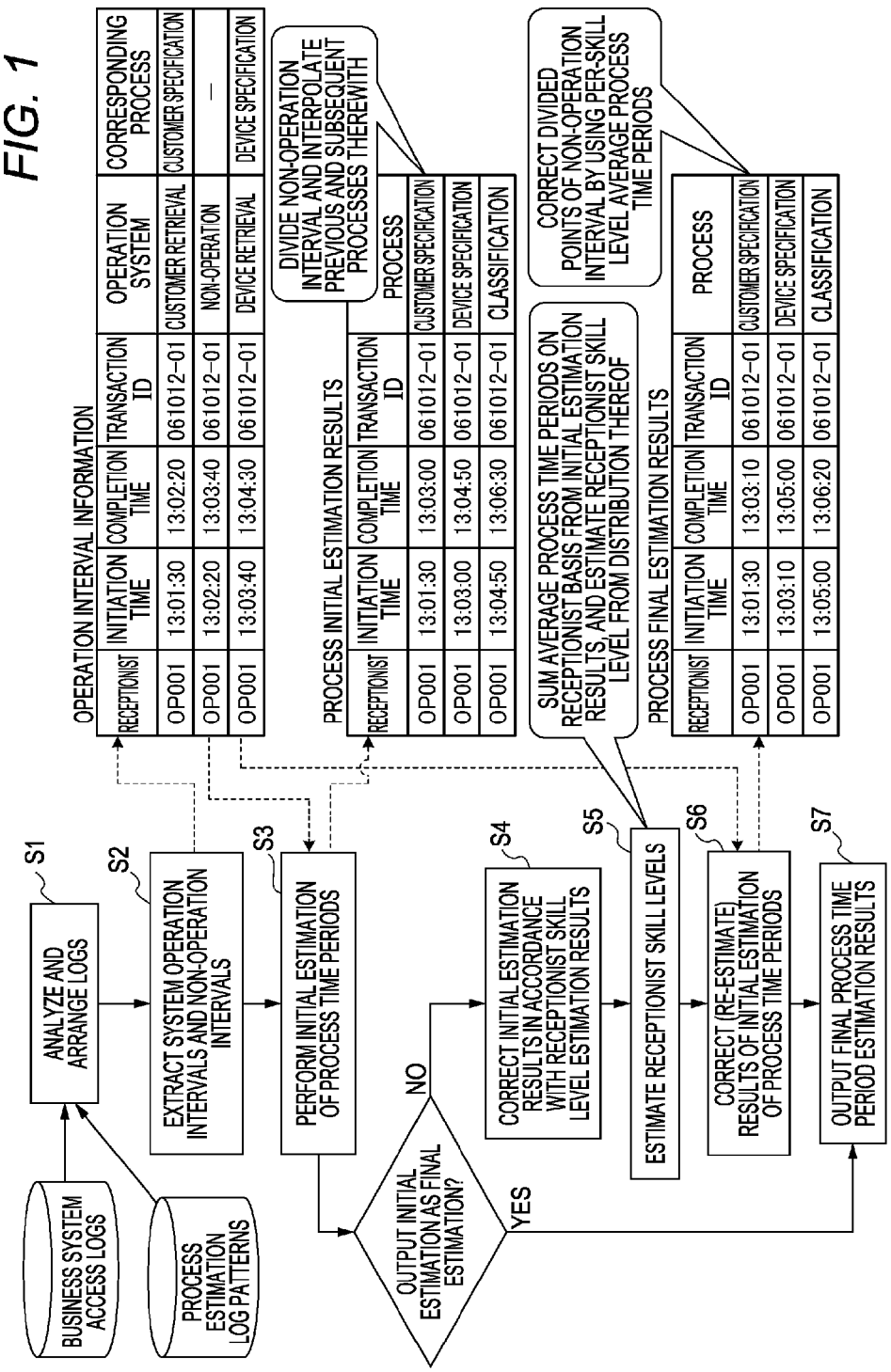
FIG. 1 is a block diagram illustrating a flow of a process estimation process in a business process estimating apparatus according to an example embodiment

Preferred embodiments will be described herebelow with reference to the accompanying example drawings, wherein like reference numerals refer to like elements throughout. Descriptions below will include example cases where example embodiments are adapted to reception businesses in a call center. Further, in description below, the terms "business process" and "business process time period", respectively, may be simply referred to as "process" and "process time period" (or "process time").

A processing flow of a process estimating process in a business process estimating apparatus according to an example first embodiment will be described hereinbelow. FIG. 1 is a block diagram showing the processing flow of the process estimating process in the business process estimating apparatus according to an example embodiment. With reference to FIG. 1, the business process estimating apparatus of an example embodiment can operate as described hereinbelow. Process estimation log patterns are referenced or accessed, and business system access logs are analyzed and arranged (at operation S1). Then, system operation intervals, corresponding processes, and non-operation intervals are extracted (at operation S2). The "system operation interval" refers to a time zone during which a receptionist is operating an operation system (information system); and the "non-operation interval" refers to a time zone during which the receptionist is not engaged in the operation of the operation system.

The time period of the non-operation interval (or, "non-operation interval time period", herebelow) is divided in accordance with standard process time periods, and the divided time periods are distributed to previous and subsequent processes, thereby to perform initial estimation of process time periods of the respective processes (at operation S3). In an example first embodiment, the initial estimation results are output by the business process estimating apparatus as final estimation results (at operation S7).

According to a business process estimating apparatus according to an example second embodiment, average time periods necessary for each process ("average time period", hereinbelow) on a receptionist basis are summed from the results of initial estimation (at operation S4). Then, the level of skill (or, "skill level") of the respective receptionist is estimated in accordance with distribution of the calculation result (at operation S5). Then, the non-operation interval time period is divided by using the per-skill average process time periods, and the process time periods are re-estimated (at operation S6). Then, the re-estimated results are output as final estimation results (at operation S7).

Thus, according to the business process estimating apparatus of the example embodiments, the non-operation interval time period is distributed to the previous and subsequent processes, whereby the processes can be comprehensively estimated, and the respective process time periods can be accurately estimated.

Figure 2:
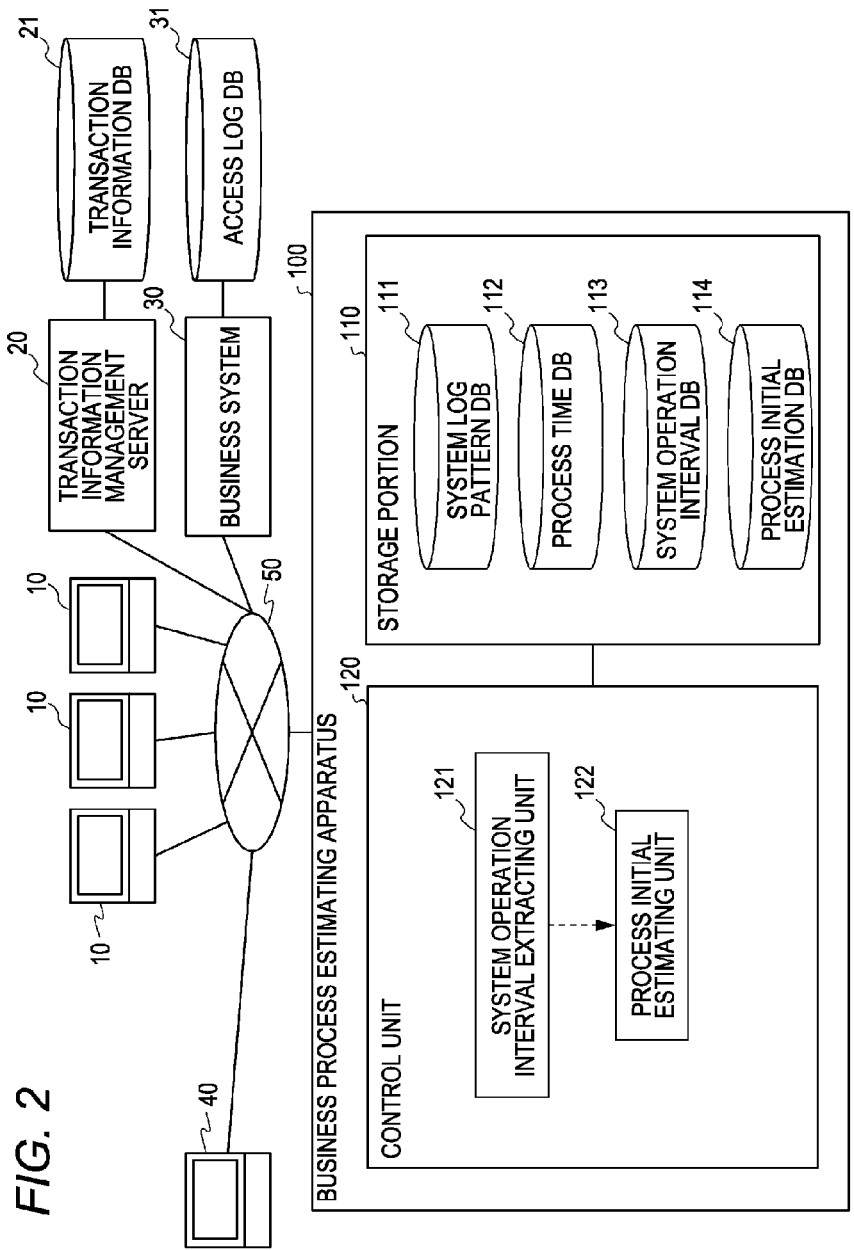
FIG. 2 is a functional block diagram showing an example configuration of the business process estimating apparatus.

An example configuration of the business process estimating apparatus according to the first embodiment will be described herebelow. FIG. 2 is a functional block diagram showing the example configuration of the business process estimating apparatus, which is shown with reference numeral 100, of the first embodiment. With reference to FIG. 2, the example business process estimating apparatus 100 is connected to a receptionist terminal 10, a transaction information management server 20, a business system 30, and an administrator terminal 40 via a LAN (local area network) 50.

The receptionist terminal 10 can be, for example, a terminal that is operated when a receptionist, who is responsible for performing a service of reception through communication with a customer, operates operation systems, such as a customer retrieval system, a QA retrieval system, and a manual presentation system.

The transaction information management server 20 can be, for example, is a computer that manages information related to a transaction received by the receptionist, by using a transaction information DB (database) 21. The transaction information DB 21 can be, for example a database storing transaction information. FIG. 3 is a table showing one example of a data table stored in the transaction information DB 21. With reference to FIG. 3, the transaction information DB 21 stores a transaction ID that identifies the transaction, a receptionist ID that identifies the receptionist, reception initiation date and time, and reception completion date and time as transaction information on a transaction basis.

Upon receipt of a notification of reception initiation from a receptionist, the transaction information management server 20 automatically allocating a transaction ID, and then writes the transaction ID, receptionist ID, and reception initiation date and time as new transaction information into the transaction information DB 21. Further, upon receipt of a notification of reception completion from a receptionist, the transaction information management server 20 writes the time of the reception completion as reception completion date and time of the corresponding transaction into the transaction information DB 21.

The business system 30 can be, for example a computer system that is accessed when a receptionist operates the operation systems, such as the customer information retrieval system, QA retrieval system, and manuals disclosure or presentation system. The business system 30 manages access related logs by using an access log DB 31. The access log DB 31 is a database that stores access logs. FIG. 4 shows one example of a data table stored in the access log DB 31. As shown in FIG. 4, the access log DB 31 stores the date and time of access, a receptionist ID of a receptionist who has made the access, and an accessed address as an access log.

The administrator terminal 40 can be, for example a terminal that is used by an administrator at the call center when, for example, accessing the business process estimating apparatus 100 and the business system 30 and communicating with a receptionist.

The business process estimating apparatus 100 includes a storage portion 110 and a control portion 120. The storage portion 110 stores information necessary for estimation of the process and process time period. The control portion 120 executes processing necessary for estimation of the process and process time period. More specifically, the storage portion 110 can include a system log pattern DB 111, a process time DB 112, a system operation interval DB 113, and a process initial estimation DB 114. The control portion 120 includes a system operation interval extracting portion 121 and a process initial estimating portion 122.

The system log pattern DB 111 is a database that stores information for specifying processes from access logs, namely process estimation log patterns. FIG. 5 is a table showing one example of a data table storing therein the system log pattern DB 111. As shown in FIG. 5, the system log pattern DB 111 stores an address pattern in correlation to an operation system name and a process name. The operation system name and process name are, respectively, names of an operation system and process specified in the event that an access address of an access log partially or completely matches a character string of an address pattern.

The process time DB 112 is a database that stores a standard time period of each process (or, "standard process time period", hereinbelow). FIG. 6 is a table showing one example of a data table stored in the process time DB 112. As shown in FIG. 6, the process time DB 112 stores each standard process time period in correlation to a process name on a process basis.

The system operation interval DB 113 is a database that stores information of a respective operation interval, which is extracted in the system operation interval extracting portion 121, and information related to a specified process on the transaction basis. The information is thus stored as operation interval information. FIG. 7 is a table showing one example of a data table stored in the system operation interval DB 113. As shown in FIG. 7, the system operation interval DB 113 stores the operation interval information on a basis of the system operation performed by the receptionist. Each item of the information includes a receptionist ID, date, operation initiation time and completion time, transaction ID, and an operation system and process specified by the system operation interval extracting portion 121.

The process initial estimation DB 114 is a database that stores process information estimated by the process initial estimating portion 122 for each transaction. FIG. 8 is a table showing one example of a data table stored in the process initial estimation DB 114. As shown in FIG. 8, the process initial estimation DB 114 can store the respective item of process information including a receptionist ID, date, process initiation time and completion time, transaction ID, and process.

The system operation interval extracting portion 121 is a processing portion that extracts an operation interval on the transaction basis in accordance with an access log, and specifies a process corresponding to the extracted operation interval. The system operation interval extracting portion 121 stores information related to extracted operation intervals and corresponding processes into the system operation interval DB 113. According to the system operation interval extracting portion 121, an operation system corresponding to an interval in which the system operation is not performed by the receptionist can be termed as a "non-operation" mode.

The process initial estimating portion 122 is a processing portion that distributes an interval in which an operation system of the system operation interval DB 113 corresponding to the "non-operation" mode as previous and subsequent process time periods. The process initial estimating portion 122 stores process information reflective of the distribution result into the process initial estimation DB 114. When the non-operation interval time interval is distributed by the process initial estimating portion 122 to be the previous and subsequent process time periods, the processes can be comprehensively estimated, and the process time periods can be accurately estimated.

Figure 9:
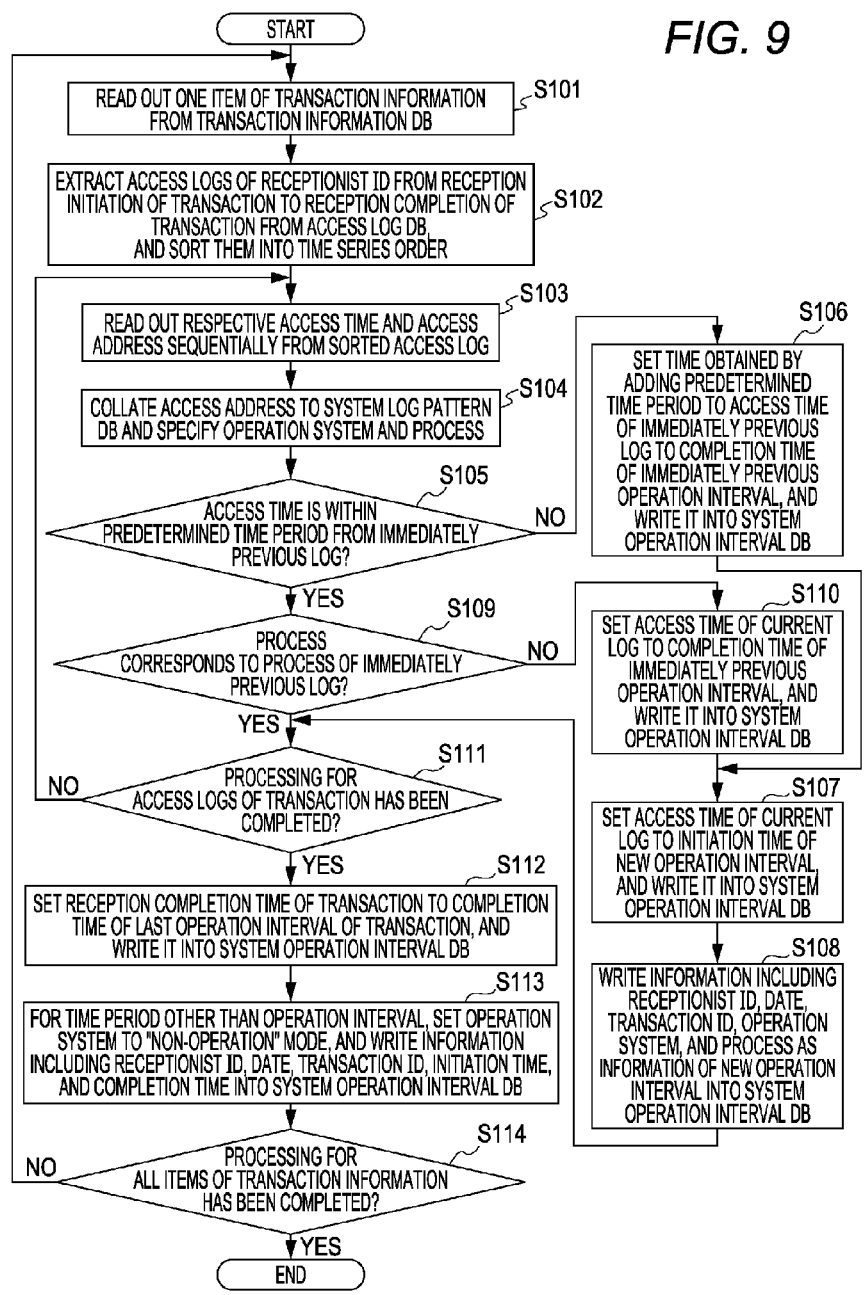
FIG. 9 is a flow chart illustrating an example processing procedure of a system operation interval extraction process in a system operation interval extracting portion.

A processing procedure of the system operation interval extracting process to be run or executed in the system operation interval extracting portion 121 will be described herebelow. FIG. 9 is a flow chart illustrating the processing procedure of the system operation interval extraction process in the system operation interval extracting portion 121. With reference to FIG. 9, the system operation interval extracting portion 121 can operate as described in the following paragraphs.

One item of transaction information is read out from the transaction information DB 21 (at operation S101). Access logs of a receptionist ID in the time period from the instance of reception initiation to the instance of reception completion are extracted from the access log DB 31, and are then sorted into time series order (at operation S102).

Then, an access time and access address are read out sequentially from the sorted access log (at operation S103). Then, the access address is collated with an address pattern stored in the system log pattern DB 111, thereby to specify an operation system and process corresponding to the access address (at operation S104).

Subsequently, it can be determined whether the access time is within a predetermined time period from the access time of the immediately previous log (at operation S105). If the access time is not within the predetermined time period, then a time obtained by adding the predetermined time period to the access time of the immediately previous log is set to a completion time of an immediately previous operation interval, and is written into the system operation interval DB 113 (at operation S106). In addition, the access time of the current log is set to an initiation time of a "new operation interval" and is written into the system operation interval DB 113 (at operation S107). Information including the corresponding receptionist ID, date, transaction ID, operation system, and process is written as information of the new operation interval into the system operation interval DB 113 (at operation S108).

If the access time is not within the predetermined time period, it can be determined by the system operation interval extracting portion 121 whether the process corresponds to the process of immediately previous log (at operation S109). If the process does not correspond to the log, the access time of the current log is set to the completion time of the immediately previous operation interval and is written into the system operation interval DB 113 (at operation S110). Then, the access time of the current log is set to the initiation time of the new operation interval and is written into the system operation interval DB 113 (at operation S107). Then, the corresponding receptionist ID, date, transaction ID, operation system, and process are written as information of the new operation interval into the system operation interval DB 113 (at operation S108).

Subsequently, it can be determined whether processing for the access logs of the transaction has been completed (at operation S111). If the processing has not yet been completed, the processing procedure returns to operation S103 and executes the process for a subsequent access log.

Otherwise, the processing for the access logs of the transaction has been completed, the system operation interval extracting portion 121 can operate as follows. A reception completion time of the transaction is set to a completion time of a last operation interval of the transaction and is written into the system operation interval DB 113 (at operation S112). Then, correspondingly to a time period other than the operation interval, the operation system is set to the "non-operation" mode, and information including a receptionist ID, date, transaction ID, initiation time, and completion time is written into the system operation interval DB 113 (at operation S113).

Subsequently, it can be determined whether processing for all items of the transaction information has been completed (at operation S114). If the processing has not yet been completed, the processing procedure returns to operation S101, thereby to process the subsequent transaction. Otherwise, the processing for the all items of transaction information has been completed, the system operation interval extracting process terminates.

Thus, the system operation interval extracting portion 121 can operate in the manner that, when no access is made to a different operation system within the predetermined time period, the time obtained by adding the predetermined time period to the initiation time of the previous operation interval is set to the completion time of the previous operation interval. This enables the extraction of the non-operation interval.

Figure 10:
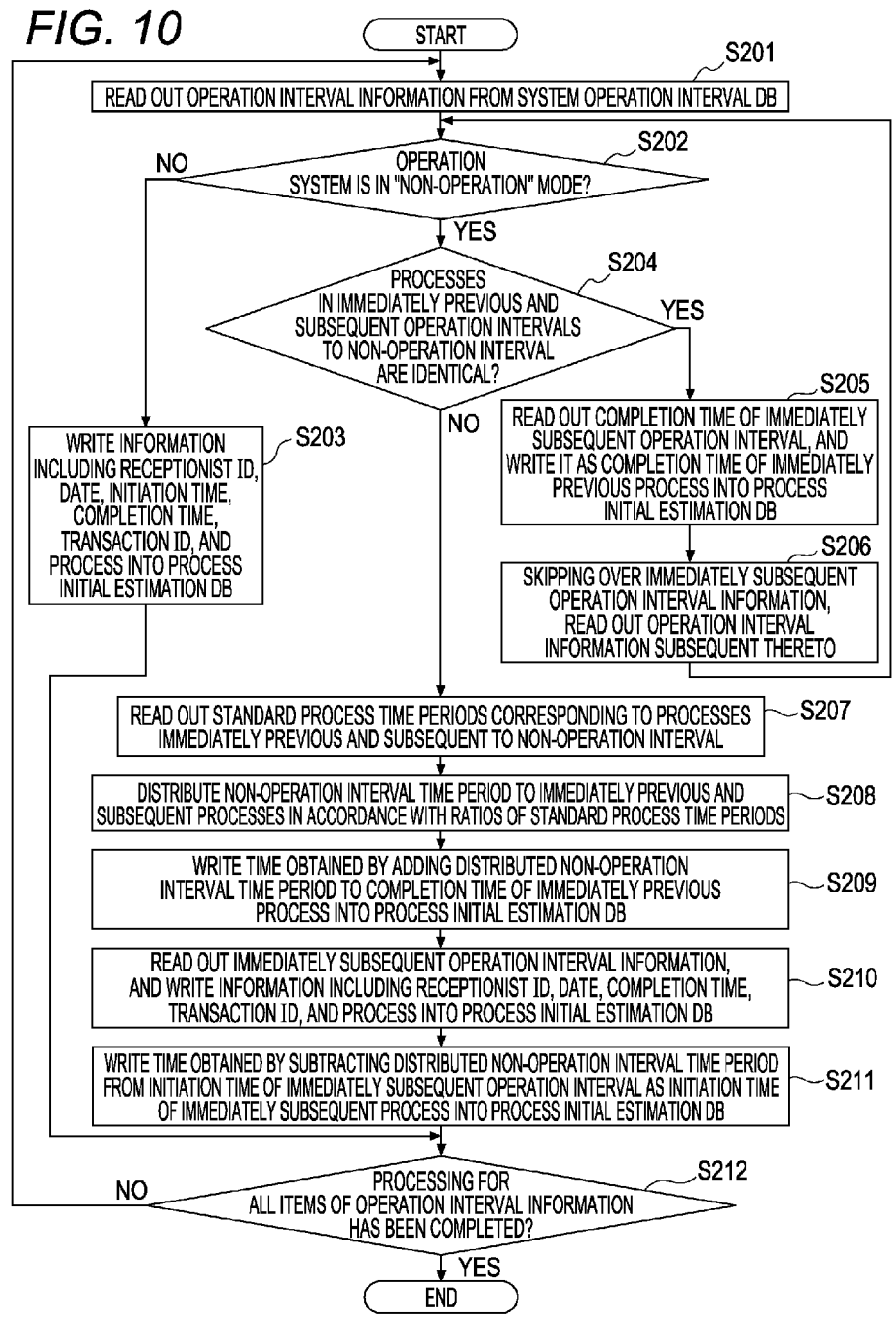
FIG. 10 is an example flow chart illustrating a processing procedure of a process initial estimation process in a process initial estimating portion.

A processing procedure of a process initial estimation process in the process initial estimating portion 122 will be described hereinbelow. FIG. 10 is a flow chart illustrating an example processing procedure of the process initial estimation process in the process initial estimating portion 122.

With reference to FIG. 10, the process initial estimating portion 122 can operate in the following manner. One item of operation interval information is read out from the system operation interval DB 113 (at operation S201). Then, it can be determined from the information whether a corresponding operation system is in the "non-operation" mode (at operation S202). As a consequence, if the operation system is not in the "non-operation" mode, then information including a receptionist ID, date, initiation time, completion time, transaction ID, and process is written as new process information into the process initial estimation DB 114 (at operation S203).

Otherwise, if the operation system is in the "non-operation" mode, then at operations S204 to S211 the procedure executes the process of distributing a non-operation interval time period as previous and subsequent process time periods. More specifically, it can be determined whether processes in immediately previous and subsequent operation intervals to the non-operation interval are identical to each other (at operation S204). If the processes are identical, a completion time of the immediately subsequent interval is read out, and is written as a completion time of the immediately previous process into the process initial estimation DB 114 (at operation S205). Then, skipping over immediately subsequent operation interval information, the processing procedure reads out operation interval information subsequent thereto (at operation S206). Then, the processing procedure returns to operation S202.

Otherwise, if the processes of immediately previous and subsequent operation intervals to the non-operation interval are not identical to each other, the process initial estimating portion 122 can operate in the following manner. Standard process time periods corresponding to the processes immediately previous and subsequent to the non-operation interval are read out from the process time DB 112 (at operation S207). Then, the non-operation interval time period is distributed to the immediately previous and subsequent processes in accordance with ratios of the standard process time periods (at operation S208). Then, a time obtained by adding the distributed non-operation interval time period to the completion time of the immediately previous process is written into the process initial estimation DB 114 (at operation S209). Then, immediately subsequent operation interval information is read out, and information, e.g., including a receptionist ID, date, completion time, transaction ID, and process is written as new process information into the process initial estimation DB 114 (at operation S210). Then, a time obtained by subtracting the distributed non-operation interval time period from the initiation time of the immediately subsequent operation interval is written as the initiation time of the immediately subsequent process into the process initial estimation DB 114 (at operation S211).

Subsequently, it can be determined whether processing for all items of operation interval information has been completed (at operation S212). If the processing has not yet been completed, then the processing procedure returns to operation S201, thereby to process a subsequent operation interval. Otherwise, if the processing has been completed, the process initial estimation process terminates.

As described above, the process time periods can be accurately estimated in the manner that the non-operation interval time period is distributed by the process initial estimating portion 122 to the previous and subsequent processes in accordance with the ratios of the standard process time periods of the processes.

FIGS. 11A and 11B are tables showing example distributions of a non-operation interval, which distributions are provided by the process initial estimating portion 122. As shown in FIG. 11A, the non-operation interval time period in the system operation interval DB 113 is 90 sec. from "09:06:30" (respectively represents as "09 hours, 06 minutes, and 30 seconds") to "09:08:00". In addition, the respective standard process time periods of the processes "customer specification" and "device specification" read out from the process time DB 112 shown in FIG. 6 are 250 sec. and 200 sec.

Accordingly, the distributed time period of the non-operation interval to the process "customer specification" is calculated as "90×250/(250+200)=50." Similarly, the distributed time period of the non-operation interval to the process "device specification" is calculated as "90×200/(250+200)=40". As a consequence, as shown in the process initial estimation DB 114 in FIG. 11B, the completion time of the process "customer specification" is changed to "09:07:20", which is 50 seconds after "09:06:30", and the initiation time of the process "device specification" is changed to "09:07:20", which is 40 seconds before "09:08:00".

As described above, according to an example first embodiment, the operation system to be operated by the receptionist, address pattern to be accessed thereby, and process (name) are correlated and stored into the system log pattern DB 111, and the operation interval is extracted by the system operation interval extracting portion 121 by using the transaction information, access log, and system log pattern DB 111. Further, the corresponding process and non-operation interval are specified, and the non-operation interval time period is distributed by the process initial estimating portion 122 to the processes previous and subsequent to the non-operation interval in accordance with the ratios of the standard process time periods. Consequently, the processes can be comprehensively estimated, and the accuracy of the process time period estimation can be improved.

As above, the example first embodiment has been described with reference to the example case in which the non-operation interval time period is distributed to the previous and subsequent processes in accordance with the ratios of the standard process time periods. However, in the case the process time period is different or variable depending upon the level of skill of the receptionist, other time distributions can be obtained with use of skill dependant ratios of process time periods, that is, ratios of process time periods dependant upon the level of skill of the receptionist. An example second embodiment will be described with reference to an example case in which the non-operation interval time period is distributed with use of the skill dependant ratios of process time periods.

Figure 12:
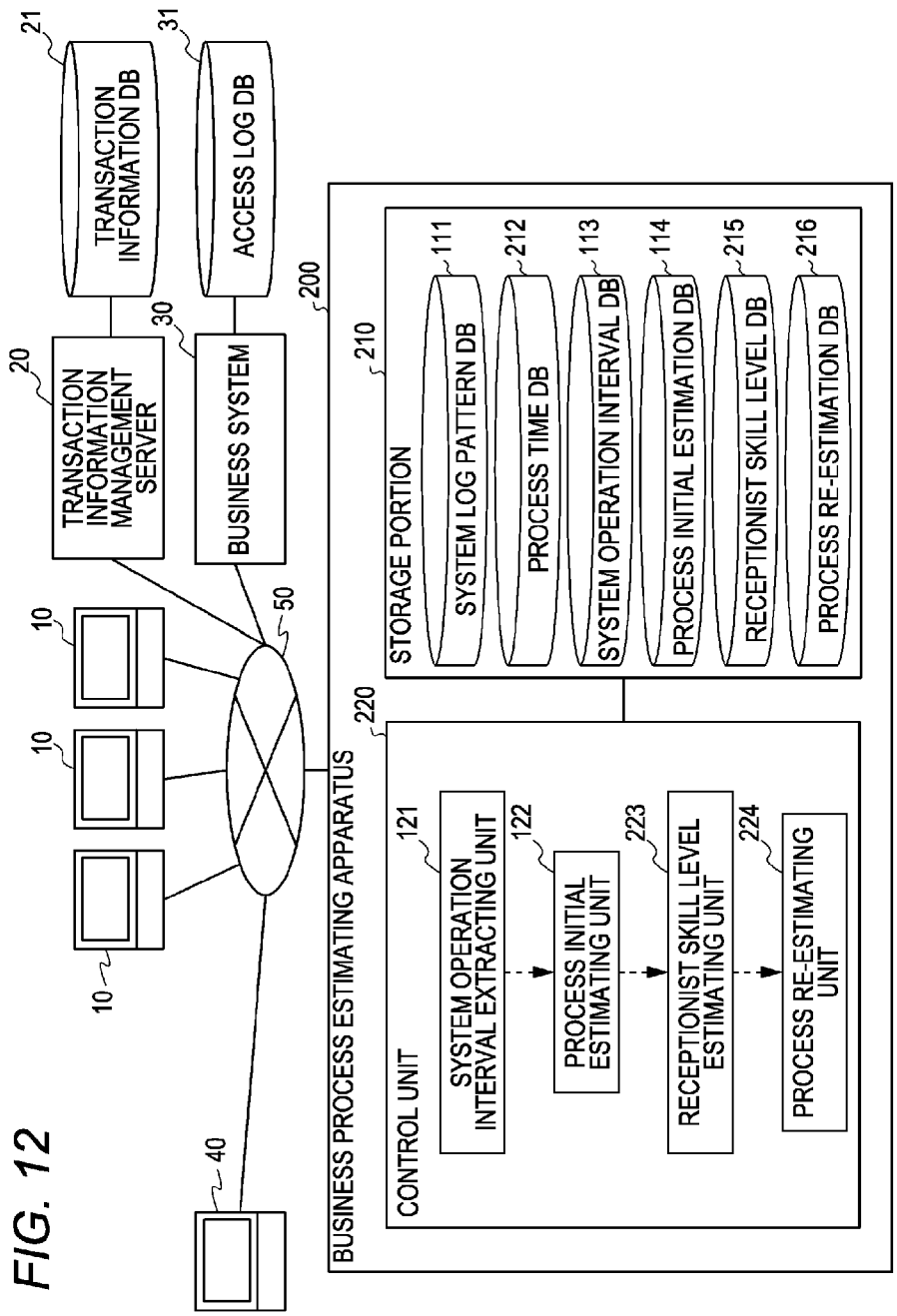
FIG. 12 is a functional block diagram showing the example configuration of a business process estimating apparatus according to another embodiment.

A configuration of a business process estimating apparatus according to the example second embodiment will be described herebelow. FIG. 12 is a functional block diagram of the example configuration of the business process estimating apparatus, which is shown with reference numeral 200, of the second embodiment. For the convenience of description, in an example embodiment, similar or same reference numerals as those in FIG. 2 refer to similar or same functional portions as those shown in FIG. 2, and detailed descriptions of the functional portions will be omitted herefrom. With reference to FIG. 12, compared with the business process estimating apparatus 100 shown in FIG. 2, the business process estimating apparatus 200 is different therefrom in that it includes a storage portion 210 and a control portion 220 that replace the storage portion 110 and control portion 120, respectively.

Compared with the storage portion 110, the storage portion 210 includes a process time DB 212 in place of the process time DB 112, and further includes a receptionist skill level DB 215 and a process re-estimation DB 216. Compared with the control portion 120, the control portion 220 includes a receptionist skill level estimating portion 223, and a process re-estimating portion 224.

The receptionist skill level DB 215 is a database that stores per-process skill levels of respective receptionists. FIG. 13 is a table showing one example of a data table stored in the receptionist skill level DB 215. As shown in FIG. 13, the receptionist skill level DB 215 stores the per-process average process time period and the levels of skill corresponding to respective receptionists. The average process time period and the skill level are calculated by the receptionist skill level estimating portion 223.

The process time DB 212 is a database that stores a standard process time periods, and in addition, per-skill average process time periods. FIG. 14 is a table showing one example of a data table stored in the process time DB 212. As shown in FIG. 14, the process time DB 212 stores a respective process name, standard process time period, high-level skilled receptionist average process time period and low-level skilled receptionist average process time period in correlation to one another. The high-level and low-level skilled receptionist average process time periods are calculated by the receptionist skill level estimating portion 223.

The process re-estimation DB 216 is a database that stores each item of process information including, for example, process time periods obtained in the manner that the non-operation interval is redistributed with use of ratios of process time periods corresponding to the receptionist skill levels. FIG. 15 is a table showing one example of a data table stored in the process re-estimation DB 216. As shown in FIG. 15, similarly as the process initial estimation DB 114, the process re-estimation DB 216 stores the process information including a receptionist ID, date, process initiation time and completion time, transaction ID, and process. In this case, however, the process initiation time and completion time, respectively, are times obtained in the manner that the non-operation interval is redistributed with use of ratios of process time periods corresponding to the receptionist skill levels. These times are calculated by the process re-estimating portion 224.

The receptionist skill level estimating portion 223 is a processing portion that specifies the respective receptionist skill level, high-level skilled receptionist average process time period, and low-level skilled receptionist average process time period by referencing the process initial estimation DB 114. More specifically, the receptionist skill level estimating portion 223 calculates a per-receptionist average process time period on the receptionist basis, and specifies a per-receptionist level of skill with use of a per-receptionist average process time period distribution model.

FIG. 16 illustrates examples of per-receptionist average process time distribution models. In the respective average process time period distribution model, a high skill level receptionist distribution model $f_H(x)$ and a low skill level receptionist distribution model $f_L(x)$, respectively, are log-normal distributions (or, "logarithmic normal distributions"), and an average process time period distribution model $f(x)$ represents a superposition of $f_H(x)$ and $f_L(x)$; that is $f(x)=f_H(x)+f_L(x)$.

Then, the receptionist skill level estimating portion 223 can operate as follows. A per-receptionist average process time distribution is fitted to the distribution model, thereby calculating distribution model parameters $\sigma_H$, $\mu_H$, $\sigma_L$, and $\mu_L$. Then, in accordance with the calculated distribution model parameters, a threshold value for determining the high or low skill level, or more specifically, a crosspoint of $f_H(X)$ and $f_L(X)$ is calculated. Then, when the average process time period of the receptionist is greater than the threshold value, the skill level is determined to be "low". Otherwise, when the average process time period of the receptionist is smaller than the threshold value, the level of skill is determined to be "high". In addition, average process time periods are averaged on the skill level basis, thereby to calculate the high-level skilled receptionist average process time period and the low-level skilled receptionist average process time period.

The process re-estimating portion 224 is a processing portion that re-estimates a process time period for each transaction with use of the receptionist skill level and the high-level and low-level receptionist average process time periods specified by the receptionist skill level estimating portion 223. Since the process re-estimating portion 224 re-estimates the process time period for each transaction with use of the receptionist skill level and the high-level and low-level receptionist average process time periods, the respective process time period can be re-estimated even more accurately.

Figure 17:
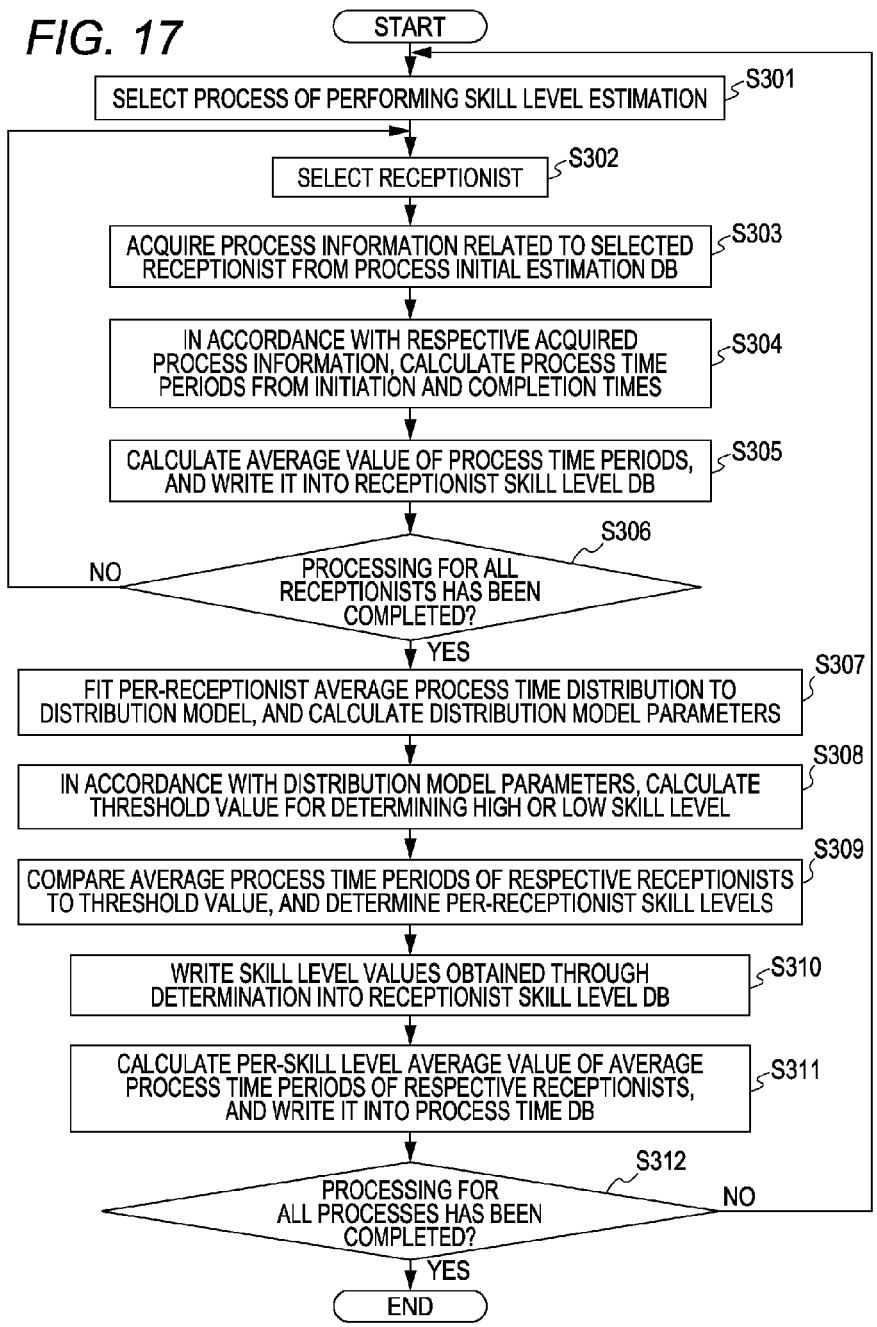
FIG. 17 is a flow chart illustrating a processing procedure of a receptionist skill level estimation process in a receptionist skill level estimating portion.

A processing procedure of a receptionist skill level estimation process in the receptionist skill level estimating portion 223 will be described herebelow. FIG. 17 is a flow chart illustrating the processing procedure of the receptionist skill level estimation process in the receptionist skill level estimating portion 223. With reference to FIG. 17, the receptionist skill level estimating portion 223 can operate as described herebelow. A process corresponding to the skill level estimation is selected (at operation S301), and a receptionist corresponding to the process is selected (at operation S302).

Items of process information related to the selected receptionist are acquired (read out) from the process initial estimation DB 114 (at operation S303). In accordance with the respective acquired items of process information, process time periods are calculated from initiation and completion times (at operation S304). Then, an average value of the process time periods is calculated and written into the receptionist skill level DB 215 as an average process time period corresponding to the selected receptionist and process (at operation S305).

Subsequently, it is determined whether the processing for all receptionists has been completed (at operation S306). If the processing has not yet been completed, the processing procedure returns to operation S302, and selects a subsequent receptionist.

Otherwise, the processing for the all receptionists has been completed, the receptionist skill level estimating portion 223 can operate as follows. A per-receptionist average process time distribution is fitted to the distribution model, and distribution model parameters are calculated (at operation S307). Then, in accordance with the calculated distribution model parameters, a threshold value for determining the high or low skill level is calculated (at operation S308)

The average process time periods of the respective receptionists are compared to the threshold value, thereby to determine the per-receptionist skill levels (at operation S309). Then, skill level values obtained through the determination are written into the receptionist skill level DB 215 (at operation S310).

Subsequently, an average value of the average process time periods of the respective receptionists are calculated on the skill level basis and are written into the process time DB 212 (at operation S311). Then, it can be determined whether the processing for all processes has been completed (at operation S312). If there still remain one or more processes not completed in the processing, then the processing procedure returns to operation S301 and selects a subsequent process. Otherwise, if the processing for the all processes has been completed, then the receptionist skill level estimation process terminates.

Thus, in the receptionist skill level estimating portion 223, the skill level of each receptionist is estimated, and the per-skill level average process time period is calculated. Consequently, in the process re-estimating portion 224, the non-operation interval time period can be distributed with use of the per-skill level average process time period.

A processing procedure of the process re-estimation process in the process re-estimating portion 224 will be described herebelow. FIG. 18 is a flow chart illustrating the processing procedure of the process re-estimation process in the process re-estimating portion 224.

With reference to FIG. 18, the process re-estimating portion 224 can operate in the following manner. One item of operation interval information is read out from the system operation interval DB 113 (at operation S401). Then, it is determined whether a corresponding operation system is in the "non-operation" mode (at operation S402). As a consequence, if the operation system is not in the "non-operation" mode, then information including a receptionist ID, date, initiation time, completion time, transaction ID, and process is written into the process re-estimation DB 216 (at operation S403).

If the operation system is in the "non-operation" mode, then at operation S404 to S412 the process re-estimating portion 224 executes the process of distributing a non-operation interval time period as previous and subsequent process time periods. More specifically, it is determined whether processes of immediately previous and subsequent operation intervals to the non-operation interval are identical to each other (at operation S404). If the processes are identical, a completion time of the immediately subsequent operation interval is read out, and is written as a completion time of the immediately subsequent process into the process re-estimation DB 216 (at operation S405). Then, skipping over immediately subsequent operation interval information, the processing procedure reads out operation interval information subsequent thereto (at operation S406). Then, the processing procedure returns to operation S402.

Otherwise, if the processes of immediately previous and subsequent operation intervals to the non-operation interval are not identical to each other, the process re-estimating portion 224 can operate in the following manner. Skill levels of the receptionist corresponding to the processes immediately previous and subsequent to the non-operation interval are read out from the receptionist skill level DB 215 (at operation S407). Then, average process time periods corresponding to the processes immediately previous and subsequent to the non-operation interval and skill levels of the receptionist are read out from the process time DB 212 (at operation S408). Then, the non-operation interval time period is distributed to the immediately previous and subsequent processes at ratios of the per-skill level average process time periods (at operation S409). Then, a time obtained by adding the distributed non-operation interval time period to the completion time of the immediately previous process is written into the process re-estimation DB 216 (at operation S410). Then, immediately subsequent operation interval information is read out, and information including a receptionist ID, date, completion time, transaction ID, and process is written into the process re-estimation DB 216 (at operation S411). Then, a time obtained by subtracting the non-operation interval time period from the initiation time of the immediately subsequent operation interval is written as the initiation time of the immediately subsequent process into the process re-estimation DB 216 (at operation S412).

Subsequently, the process re-estimating portion 224 can operate in the following manner. It can determined whether processing for all items of operation interval information has been completed (at operation S413). If the processing has not yet been completed, then the processing procedure returns to operation S401, thereby to process a subsequent operation interval. Otherwise, if the processing has been completed, then the process re-estimation process terminates.

As described above, the process time periods can be accurately estimated in the manner that the non-operation interval time period is distributed by the process re-estimating portion 224 to the previous and subsequent processes in accordance with the ratios of the per-skill level average process time periods.

FIGS. 19A and 19B are tables showing example distributions of a non-operation interval, which distributions are provided by the process re-estimating portion 224. According to the example part of the receptionist skill level DB 215 shown in FIG. 13, the skill level of a receptionist "OP001" for the process "customer specification" is "high", and the skill level from the process "device specification" is "low". Consequently, the high-level skilled receptionist average process time period of 205 seconds for the process "customer specification" and the low-level skilled receptionist average process time period of 220 seconds for the process "device specification" can be obtained from the process time DB 212 shown in FIG. 14

Accordingly, as shown in FIG. 19A the distributed time period of the non-operation interval to the process "customer specification" is calculated as "90×205/(205+220)=43". Similarly, the distributed time period of the non-operation interval to the process "device specification" is calculated as "90×220/(205+220)=47". As a consequence, as shown in the process re-estimation DB 216 in FIG. 19B, the completion time of the process "customer specification" is changed to "09:07:13", which is 43 seconds after "09:06:30", and the initiation time of the process "device specification" is changed to "09:07:13", which is 47 seconds before "09:08:00".

As described above, according to the example second embodiment, the skill level of each receptionist can be specified on the process basis by the receptionist skill level estimating portion 223. In addition, the per-skill level average process time period for each process is calculated by the receptionist skill level estimating portion 223. Further, the non-operation interval time period is distributed by the process re-estimating portion 224 with use of the per-skill level average process time period instead of the standard process time period. Consequently, the respective process time period can be estimated even more accurately.

While the business process estimating apparatus has been described as above in the respective example first and second embodiments, the configuration of the business process estimating apparatus can also be realized by use of software. Thereby, a business process estimating program having functions similar to those of the apparatus can be obtained. An example computer for executing the business process estimating program will be described herebelow.

FIG. 20 is a functional block diagram showing the example configuration of a computer 300 for executing the business process estimating program 311 in accordance with the respective first and second embodiments. With reference to FIG. 20, the computer 300 includes a RAM (random access memory) 310, a CPU (central processing unit) 320, an HDD (hard disk drive) 330, a LAN interface (local area network) 340, and an I/O (input/output) interface 350, and a (digital versatile disk) DVD drive 360.

The RAM 310 is a memory for storing, for example, programs, and the results of progressive program execution. The CPU 320 is a device that executes a program by reading out the program from the RAM 310. The HDD 330 is a disk drive that stores programs and data, for example. The LAN interface 340 is an interface that connects the computer 300 to another computer via a LAN. The I/O interface 350 is an interface that connects input devices and display devices, such as a mouse and a keyboard. The DVD drive 360 is a device that performs reading and writing thereon.

The business process estimating program 311, which can be executed by the computer 300, can be provided in a form stored on the DVD. For being installed into the computer 300, the business process estimating program 311 can be read out by the DVD drive 360 from the DVD and loaded into the computer 300. Alternatively, the business process estimating program 311 can be provided in a form stored in, for example, a database of another computer system connected thereto via the LAN interface 340. In this case, the business process estimating program 311 is read out from the database and is loaded into the computer 300. The installed business process estimating program 311 is read from the RAM 310 is stored into the HDD 330. The business process estimating program 311 stored in the HDD 330 is read out into the RAM 310 and is then executed by the CPU 320.

While example embodiments have been described with reference to an example case in which the process and process time period corresponding to the respective receptionist in the call center are estimated, the embodiments are not limited thereto. Embodiments can be similarly adapted, for example, to a case in which processing is performed to estimate a process and process time period of a receptionist who is engaged in business operation on a front-end or reception counter while accessing a business system.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A business process estimating method to be used by a business process estimating apparatus for estimating a process of a business transaction utilizing an information system, the business process estimating method comprising:
    extracting an operation interval of the information system in accordance with an access log of access to the information system;
    specifying a business process corresponding to the extracted operation interval and a non-operation interval of the information system; and
    distributing, by a processor, time periods of the non-operation interval specified in the specifying to time periods of previous and subsequent operation intervals of the non-operation interval as process time periods of previous and subsequent business processes specified in the specifying respectively, the distributing time periods comprising:
    dividing a time period of the non-operating interval;
    adding one of a divided time period of the non-operating interval to a first operation interval of a first operation that is operated before the non-operating interval,
    adding another divided time period of the non-operating interval to a second operation interval of a second operation that is operated after the non-operation interval, and
    estimating the process of the business transaction based on the distributed time periods of the non-operation interval,
    wherein, in the distributing the non-operation interval time period, the time period of the information system non-operation interval is divided and distributed as the process time periods of the previous and subsequent business processes in accordance with ratios of standard time periods of the previous and subsequent business processes respectively correlated with the previous and subsequent information system operation intervals with respect to the information system non-operation interval.

2. The business process estimating method according to claim 1, wherein, when a business process different from the specified business process exceeds a predetermined time period, the information system non-operation interval is specified by setting a time obtained by adding the predetermined time period to an initiation time of the specified operation interval as an initiation time of the information system non-operation interval.

3. The business process estimating method according to claim 1, further comprising:
    estimating a skill level for each business process based on process information and calculated times of a person assigned to a business transaction in accordance with the process time period of the business process to which the time period of the information system non-operation interval has been distributed in the non-operation interval time period distributing step; and
    redistributing a non-operation time period for redistributing the time period of the information system non-operation interval as process time periods of previous and subsequent business processes by dividing the time period of the information system non-operation interval in accordance with the skill level estimated in the estimating the skill level.

4. The business process estimating method according to claim 3, wherein the redistributing the non-operation time period causes a computer to execute:
    calculating an average process time period for respective business processes on the basis of the skill level estimated in the estimating the skill level estimating; and
    distributing an average process time period ratio for redistributing the time period of the information system non-operation interval as the process time periods of the previous and subsequent business processes by dividing the time period of the information system non-operation interval in accordance with ratios of average process time periods corresponding to the skill levels of the persons assigned to the previous and subsequent business processes, the average process time periods being among the average process time periods calculated in the calculating the average process time period on the basis of the skill level for the respective business processes.

5. A business process estimating apparatus for estimating a process of a business transaction utilizing an information system, the business process estimating apparatus comprising:
    a memory; and
    a processor coupled to the memory and configured to:
    extract an operation interval of the information system in accordance with an access log of access to the information system;

specify a business process corresponding to the extracted operation interval and a non-operation interval of the information system; and distribute time periods of the non-operation interval to time periods of previous and subsequent operation intervals of the non-operation interval as process time periods of previous and subsequent business processes specified respectively, by dividing a time period of the non-operating interval;

adding one of a divided time period of the non-operating interval to a first operation interval of a first operation that is operated before the non-operating interval, adding another divided time period of the non-operating interval to a second operation interval of a second operation that is operated after the non-operation interval, and estimating the process of the business transaction based on the distributed time period of the non-operation interval, wherein the time period of the information system non-operation interval is divided and distributed as the process time periods of the previous and subsequent business processes in accordance with ratios of standard time periods of the previous and subsequent business processes respectively correlated with the previous and subsequent information system operation intervals with respect to the information system non-operation interval.

6. The business process estimating apparatus according to claim 5, wherein, when a business process different from the specified business process exceeds a predetermined time period, the information system non-operation interval is specified by setting a time obtained by adding the predetermined time period to an initiation time of the specified operation interval as an initiation time of the information system non-operation interval.

7. The business process estimating apparatus according to claim 5, wherein the processor is configured to:

estimate a skill level for each business process on the basis of a responsible person for a business transaction in accordance with the process time period of the business process to which the time period of the information system non-operation interval has been distributed, and redistribute the time period of the information system non-operation interval as process time periods of previous and subsequent business processes by dividing the time period of the information system non-operation interval in accordance with the estimated skill level.

8. The business process estimating apparatus according to claim 7, wherein the processor is configured to:

calculate average process time periods for respective business processes on the basis of the estimated skill level; and redistribute the time period of the information system non-operation interval as the process time periods of the previous and subsequent business processes by dividing the time period of the information system non-operation interval in accordance with ratios of average process time periods corresponding to the skill levels of the persons assigned to the previous and subsequent business processes, the average process time periods being among the calculated average process time periods.

* * * * *